United States Patent [19]
Johnson

[11] Patent Number: 6,069,584
[45] Date of Patent: May 30, 2000

[54] COMPETENT MUNITIONS USING RANGE CORRECTION WITH AUTO-REGISTRATION

[75] Inventor: Mark W. Johnson, Cedar Rapids, Iowa

[73] Assignee: Rockwell Collins, Inc., Cedar Rapids, Iowa

[21] Appl. No.: 08/988,307

[22] Filed: Dec. 10, 1997

[51] Int. Cl.[7] .............................. H04B 7/185; F42B 15/01
[52] U.S. Cl. ...................................... 342/357.09; 244/3.1
[58] Field of Search .............................. 342/357, 357.13, 342/357.09; 244/3.1, 3.15, 190

[56] References Cited

U.S. PATENT DOCUMENTS

| | | | |
|---|---|---|---|
| 5,432,841 | 7/1995 | Rimer | 379/59 |
| 5,490,093 | 2/1996 | Koepke | 244/3.15 |
| 5,594,454 | 1/1997 | Devereux et al. | 342/357.09 |
| 5,605,307 | 2/1997 | Batchman et al. | 244/3.11 |
| 5,647,558 | 7/1997 | Linick | 244/3.11 |
| 5,657,947 | 8/1997 | Mayersak | 244/3.19 |
| 5,762,291 | 6/1998 | Hollis | 244/3.24 |
| 5,785,281 | 7/1998 | Peter et al. | 244/190 |

OTHER PUBLICATIONS

Dougherty et al, "Application of GPS for Missile Post Flight Guidance Accuracy Analysis", Aerospace Control Systems, First IEEE Regional Conf. May 1993.

*Primary Examiner*—Gregory C. Issing
*Attorney, Agent, or Firm*—Nathan O. Jensen; Kyle Eppele; J. P. O'Shaughnessy

[57] ABSTRACT

A system for monitoring guiding and controlling an unmanned, unteathered flight vehicle, generally assumed to be moving through the atmosphere of the earth at a high rate of speed. The system comprised an on-board positional receiver and processing means coupled to a transceiver capable of combining such positional information with additional data relative to the health and status of the flight vehicle and transmitting the same to a ground station of compatible and simplified design. A preferred positional determination means is to utilize a form for GPS signal thereby affording one the opportunity to include appropriate processing software or additional componentry if necessary for base station purposes and thereby provide a relatively inexpensive system having a low probability of detection for intercept that simultaneously yields vastly improved operating performance characteristics over the mere translation of received GPS signals to down-link or to remote stations as known in the prior art. The system of the present invention may be utilized to provide auto-registration correction, range-only correction, or a combination of auto-registration and range correction.

32 Claims, 5 Drawing Sheets

COMPETENT MUNITIONS USING RANGE CORRECTION WITH AUTO-REGISTRATION

BACKGROUND OF THE INVENTION

The term navigation can be broadly defined as the means by which a craft is given guidance to travel from one known location to another. Irrespective of the size, speed or type of craft, or duration of travel, arrival at the desired destination is of paramount importance. Historically, a variety of methods have been invoked in order to accomplish navigation of a moving vehicle. With the advent of satellite position determination systems, such as the NavStar GPS, operated by the U.S. Government, precise position determination within a few meters can be accurately determined and a travel path interpolated by virtue of recording several such data points. Thus, in most instances GPS type systems have become a preferred method of navigating position determination.

The GPS system comprises a constellation of earth orbiting space vehicles that continuously transmit dual frequency telemetry that provide timing information relative to the specific spacecraft. A user having a GPS receiver, tunable to either of the two provided frequencies (L1 or L2) is able to accurately determine his position relative to the earth's surface by virtue of acquiring the signals from four or more spacecraft and determining the range of the receiver from each craft. Well known processing techniques are then utilized in order to provide the user meaningful longitude, latitude and altitude information. One of the two codes utilized, precise code or P-code, has an exceptionally long data sequence modulated at 10.23 MHz. The other telemetry stream is referred to as course/acquisition mode or C/A-code and is a gold code sequence having a chip rate of 1.023 MHz. The gold-code sequence is a well known conventional pseudo-random sequence repeated once every millisecond. Positional accuracy between the two codes varies greatly with the P-code providing the more precise measurement. In order to increase the accuracy of the C/A-code many GPS receivers work in combination with an additional signal emanating from a known location or source, thereby providing accuracy equal to or exceeding P-code. This approach is generally referred to as differential GPS, and is well known in the art.

Initial GPS receivers were quite large and expensive thereby mandating user platforms to relatively large land based or airborne vehicles. As a result of the continued evolution in the electronics industry, the physical size of individual components has shrunk exponentially, while simultaneously exhibiting functional increases of vast proportion. As a direct result of such electronic evolution, the unit price of good quality GPS receivers has continued to decrease such that prices less than five hundred dollars per unit are rather typical. The attainment of relatively low receiver unit pricing affords GPS technology to many applications heretofore considered inappropriate or non-cost beneficial for such applications.

Unmanned vehicles whether self-propelled or projected, represent a new arena of items that could benefit from GPS technology. Whether utilized in a manner to provide control and guidance during the course of flight, or whether the results of a first flight is utilized for adjustments in the trajectory of subsequent items, the inclusion of miniaturized GPS receivers on or in such items provides benefits heretofore not available to such users.

By way of example, large artillery shells directed at medium range targets (30–50 kilometers) determine target distance by virtue of a "registration" shell fired at the target. The registration shell that contains a portion of a GPS receiver and a data translator, which in effect transmits the received GPS data over a wideband signal to a ground user at a remote location. Unfortunately, a wideband analog translator is typically easily detected by surrounding users, contains no additional telemetry capability, and by virtue of size and power requirements is limited to a single frequency. Special ground equipment is required in order to receive the repeated signal from the registration shell, and in general, the system cannot accommodate more than one registration shell in flight at a given time. The accuracy provided the user of such system is generally considered to warrant the increased risk by minimizing the number of attempts necessary to place an object in a given location, and the corresponding time period from beginning to end of the mission. However, improvements in the prior art system which would provide increased stealth capability, accommodate telemetry down-link and the providing of control signals to the shell would be advantageous. Additionally, the minimization of any gear required to support such operations would also be of great benefit.

A new class of munitions, referred to as "competent" munitions, has been developed to further the end of improving the accuracy of traditional type munitions at a relatively low cost and complexity. Competent munitions are a branch of artillery munitions situated between traditional "dumb" munitions and "smart" munitions. A "dumb" munition is an area weapon incorporating no accuracy improvements. A "smart" munition is a point weapon incorporating a seeker or similar capability that seeks a particular target or target profile and navigates to that point. Thus, a "smart" munition may utilize GPS navigation as a targeting and guidance system, for example. As the range of artillery munitions increases from traditional ranges of 20–25 kilometers out to 50 kilometers and even 100 kilometers, the accuracy of "dumb" munitions degrades to a level that is unacceptable. Thus the "competent" munition is a recent innovation intended to regain the accuracy needed to make a munition accurate enough for area weapon missions at these extended ranges, while maintaining low costs close to those of "dumb" munitions. Additionally, there is some desire to use certain highly accurate competent munitions as pseudo-point weapons against large point targets that are hard to seek such as bunkers.

The general categories for competent munitions include auto-registration, range-only correction (one-dimensional), and fully-guided (two-dimensional) correction. Auto-registration, or self-registration, involves the shell providing information about its location while in flight to allow an offset from the expected or desired impact point to be calculated. This offset is used to more accurately point the gun to improve the accuracy of subsequent rounds. Auto-registration is typically the least expensive competent munition, and only the registration rounds need to have an auto-registration fuze on them, further reducing the ost of this capability. It can generally provide a two to three times error reduction over a "dumb" munition out to ranges of about 40 kilometers.

Range-only correction includes on-board navigation capability only to the level required to correct the range of the munition, correction in a single dimension. In this type of shell, the round is purposely fired at a point disposed beyond the target and a drag device is deployed at a predetermined point in the trajectory of the munition. By controlling the timing of deployment of the drag apparatus and even the amount of drag, an accurate range can be achieved. Thus, the trajectory of a shell that would nominally overshoot the target location is altered in flight by a drag apparatus thereby redirecting the shell to impact the target location. Since this shell includes on-board correction, all rounds must have the self-correcting fuze to take advantage of this capability. This fuze is probably only marginally more expensive than the auto-registration fuze, however. The range error is much larger than the cross track er-or, so just correcting the range can yield a three to six times error reduction over a "dumb" munition out to ranges of 50 or more kilometers.

Fully-guided (two-dimensional in flight correction) shells include on-board navigation to correct both the range and cross-track errors of the munition as it travels along its nominal trajectory. This type of shell requires on-board inertial sensors, as well as a complete navigation and mechanical steering capability. The accuracy of the shell is thus nearly always the same regardless of range. Since this shell includes on-board correction, all rounds must have the self-correcting fuze to take advantage of this capability. This fuze is expected to be considerably more expensive than the range-only corrected or auto-registration fuze. It can yield a three to more than ten times error reduction over a "dumb" munition out to ranges of 100 kilometers.

Since range-only correction requires a complete GPS receiver on-board the shell, the addition of an auto-registration capability only very slightly increases the circuit volume required and the cost of the fuze. This capability can then provide the range accuracy improvements of range-only correction combined with the cross track accuracy improvements of auto-registration. The range correction plus auto-registration round is expected to provide accuracies approaching that of fully-guided munitions without requiring complete inertial, navigation, and mechanical steering systems onboard the shell.

Accordingly, a need exists for an improved method of navigating and monitoring the results of such navigation of unmanned apparatus such as high-velocity missiles or shell projectiles. There further lies a need for a remote position sensing and control system for use with an unmanned flight vehicle which provides a combination of auto-registration and range correction.

SUMMARY OF THE INVENTION

The present invention comprises a method and system for providing a data-link between an unmanned apparatus traveling through the earth's atmosphere and a remotely located ground station. The system is comprised of a first radio position determination receiver mounted within the unmanned flight item, capable of instantaneous position determination relative to the earth's surface, that is electrically coupled to a transmitter also included in the unmanned item that transmits the determined instantaneous position of the item during flight to a ground station having a receiver configured to receive and process the transmit signal. Preferably, the receivers are both GPS receivers and the transmitter sends a GPS pseudo-lite signal to the ground station receiver which is specially adapted to accommodate the required processing. Additional features of the system include the ability to include telemetry data in the data down link, as well as providing a unique identifier, such as a PRN pseudo-lite number, for the given object in flight. The system provides a combination of auto-registration and range correction for the unmanned apparatus.

It is an object of the present invention to provide a system for monitoring and controlling unmanned flight vehicles, whether self-propelled or projected that travel through the earth's atmosphere.

It is a feature of the present invention to utilize a GPS receiver capable of calculating the instantaneous pseudo ranges of an item during the course of it's flight within or on the item.

It is an advantage of the present invention to provide a system of positional determination for unmanned vehicles in the earth's atmosphere to remote ground stations.

It is yet another advantage of the present invention to provide a system for simultaneously monitoring a plurality of items traveling through the earth's atmosphere with respect to their position and trajectory.

It is an additional feature of the present invention to provide a system for controlling the trajectory of an unmanned vehicle during flight using either auto-registration techniques, range-only techniques, or a combination of both control techniques.

It is a further object of the present invention to provide a triple mode control functionality for an unmanned flight vehicle such as an artillery shell that can be used to provide auto-registration only, range-only correction, or range-correction combined with auto-registration. The auto-registration mode would typically be used for short ranges and range-only correction mode and combined range-correction and auto-registration mode for longer range or higher accuracy requirement applications.

These and other objects, features and advantages of the present invention will become apparent to one of ordinary skill in the art upon examination of the subsequent drawings and detailed description.

BRIEF DESCRIPTION OF THE DRAWINGS

The numerous objects and advantages of the present invention may be better understood by those skilled in the art by reference to the accompanying figures in which.

DETAILED DESCRIPTION

The following detailed description is intended to provide specific detail enabling one of ordinary skill in the art to understand and practice the principals of the present invention. Portions of the description are set forth in terms of block diagrams or other symbolic representations of operations or data bits within a computer system. For purposes of convenience terms such as bits, elements, values, symbols, characters, and so forth have been utilized in a manner consistent with common usage so as not to obscure or diminish the principle elements of the present invention. It is understood that throughout the description utilization of such terms as calculating, displaying, transmitting, or computing refer to the common usage of such terms on computer systems, radio receivers or transmitters, or the like and that manipulation or transformation of data represented as physical quantities within the componentry of a given system is well understood by those of ordinary skill in the art.

Figure 1:
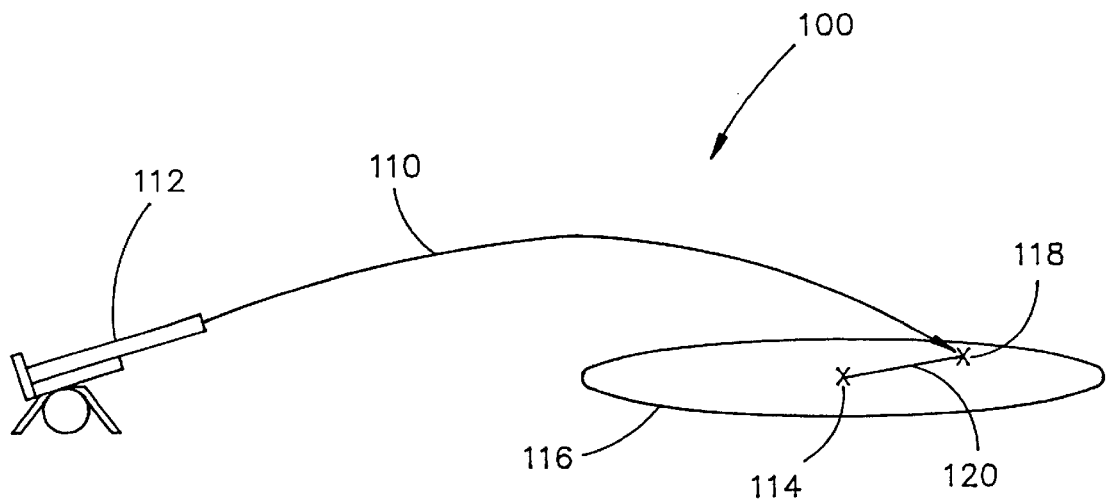
FIG. 1 is an illustration of the general principles of auto-registration correction for an unmanned vehicle or projectile in accordance with the present invention.

Referring now to the drawings, wherein like items are referenced as such throughout, FIG. 1 illustrates the general principles of auto-registration correction for an unmanned vehicle or projectile in accordance with the present invention. In an auto-registration system 100 as utilized with the present invention, a launch device such as an artillery gun 112 launches an artillery shell, an unmanned flight vehicle, toward a remote target 114. The error distribution area 116 in which the shell is statistically likely to impact may be generally defined as an ellipsoid having its center coincident with the target location and having its longer axis aligned with the trajectory 110 of the shell. Thus, with auto-registration, a special fuze is utilized having a tracking system disposed therein which provides information about its actual location during flight. If the shell impacts at a point 118 offset from the desired target point 114, the amount of offset 120 is determined and the launch device may make an appropriate aiming correction for subsequently launched vehicles.

Figure 2:
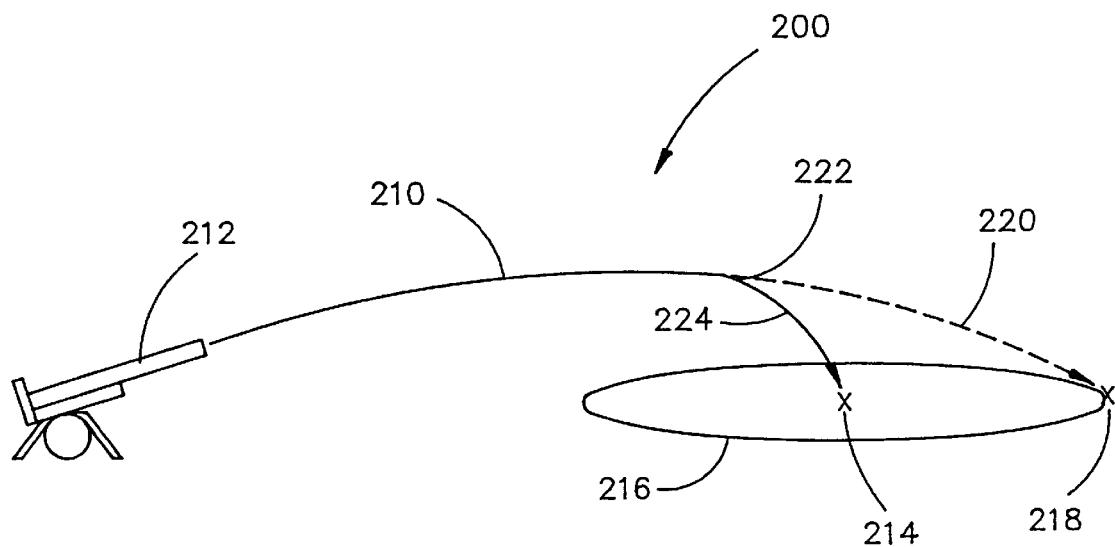
FIG. 2 is an illustration of the general principles of range-only correction for an unmanned vehicle or projectile in accordance with the present invention.

Referring now to FIG. 2, the general principles of range-only correction for an unmanned vehicle or projectile in accordance with the present invention are shown. In a range-only system 200 as utilized with the present invention, a launch device such as an artillery gun 212 launches an artillery shell, an unmanned flight vehicle, toward a remote target point 214. Tie error distribution area 216 in which the shell is statistically likely to impact may be generally defined as an ellipsoid having its center coincident with the target point 214 and having its longer axis aligned with the trajectory 210 of the shell. In the range-only correct system, the shell is intentionally fired at a point 218 disposed beyond the target point. If no flight corrections are made, the shell will nominally follow a trajectory 220 terminating at point 218. However, at a predetermined point 222 in the trajectory 210, a drag device in the fuze is deployed which alters the path of the shell to follow a corrected trajectory 224 which terminates at the desired location 214. Control of the timing of the deployment of the drag device is used to obtain the desired corrected trajectory.

Figure 3:
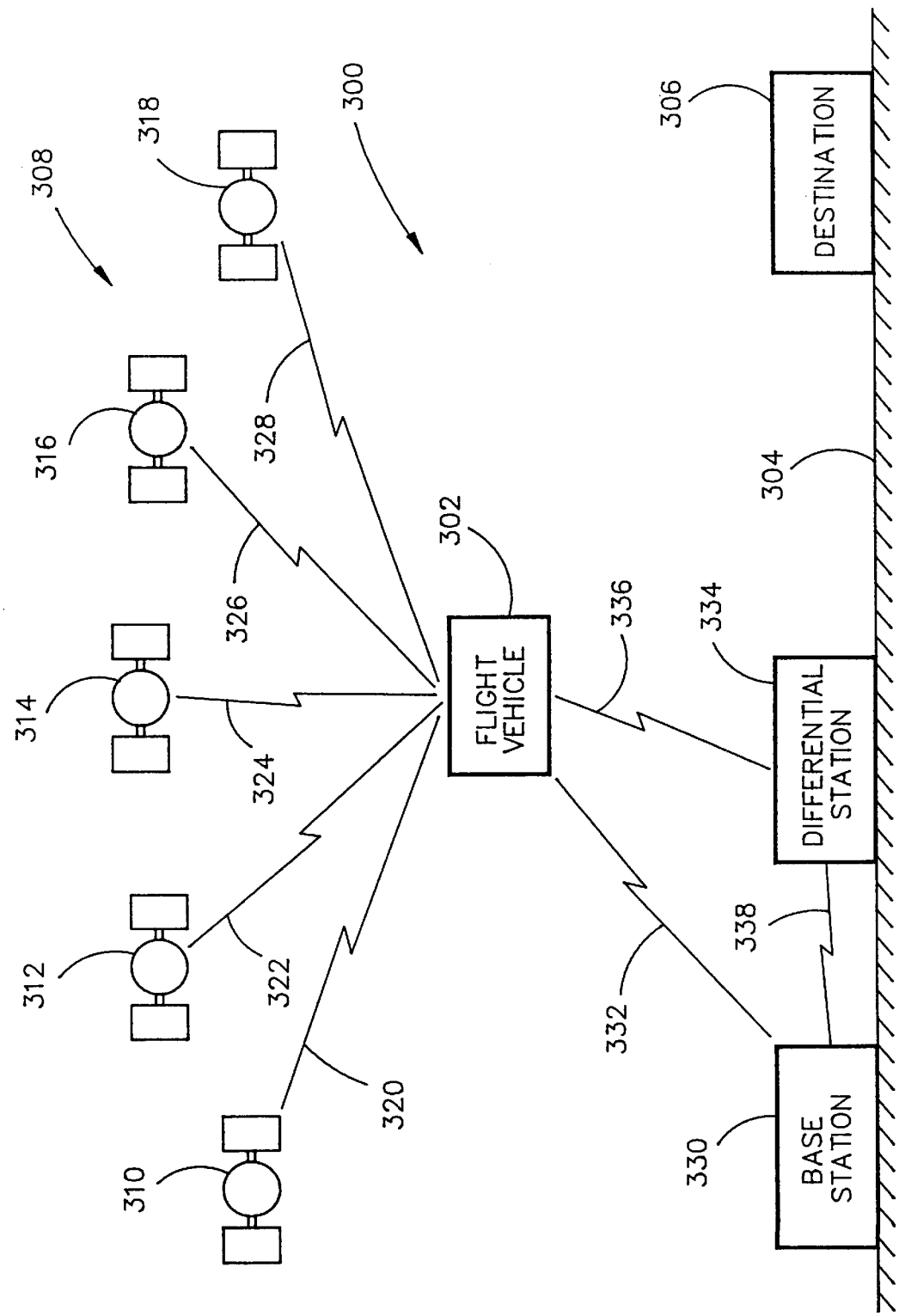
FIG. 3 is an illustration of an embodiment of a remote position sensing and control system in accordance with the present invention.
Figure 4:
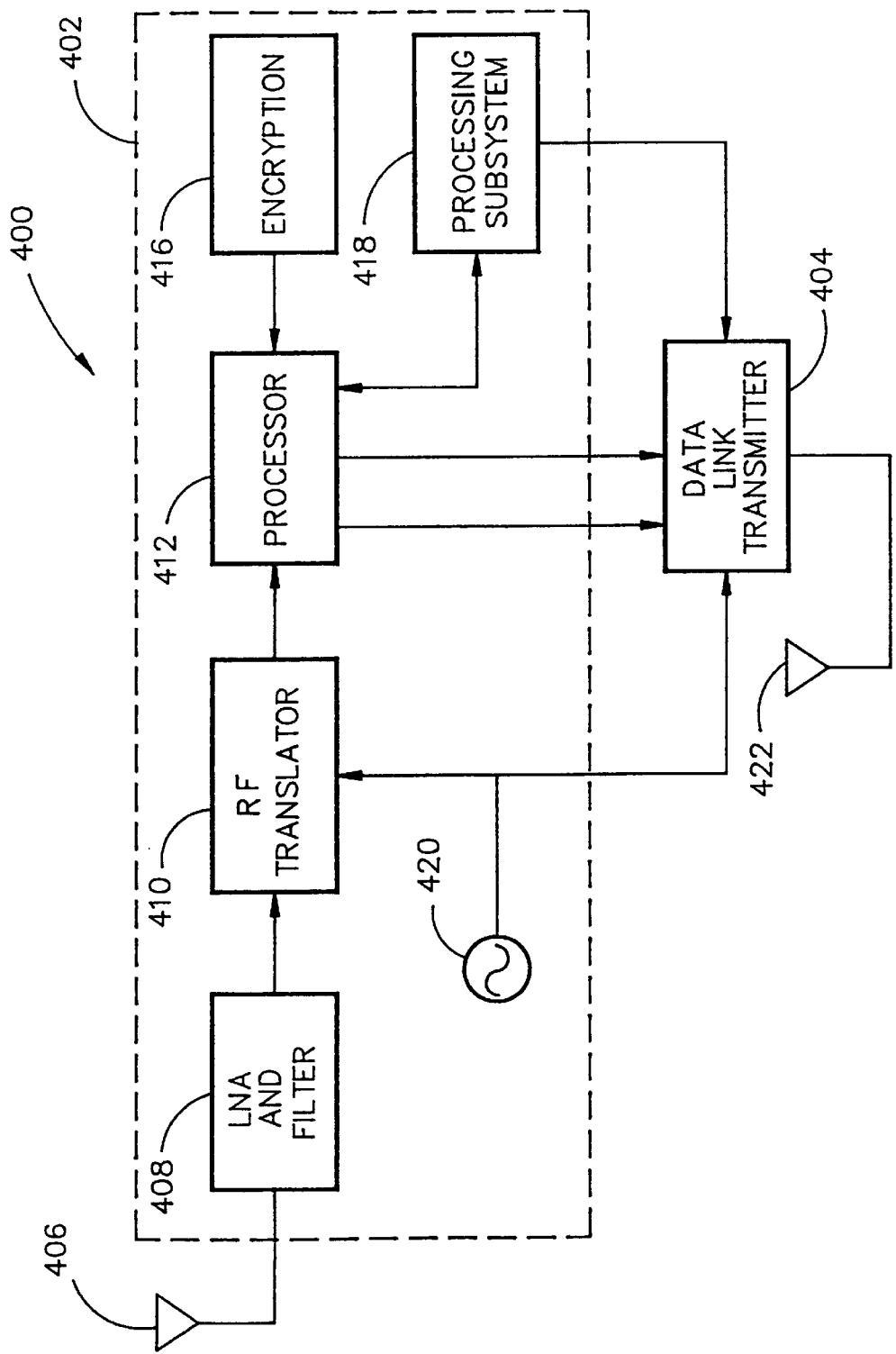
FIG. 4 is a block diagram of an embodiment of a communications system for utilization with the system of the present invention.
Figure 5:
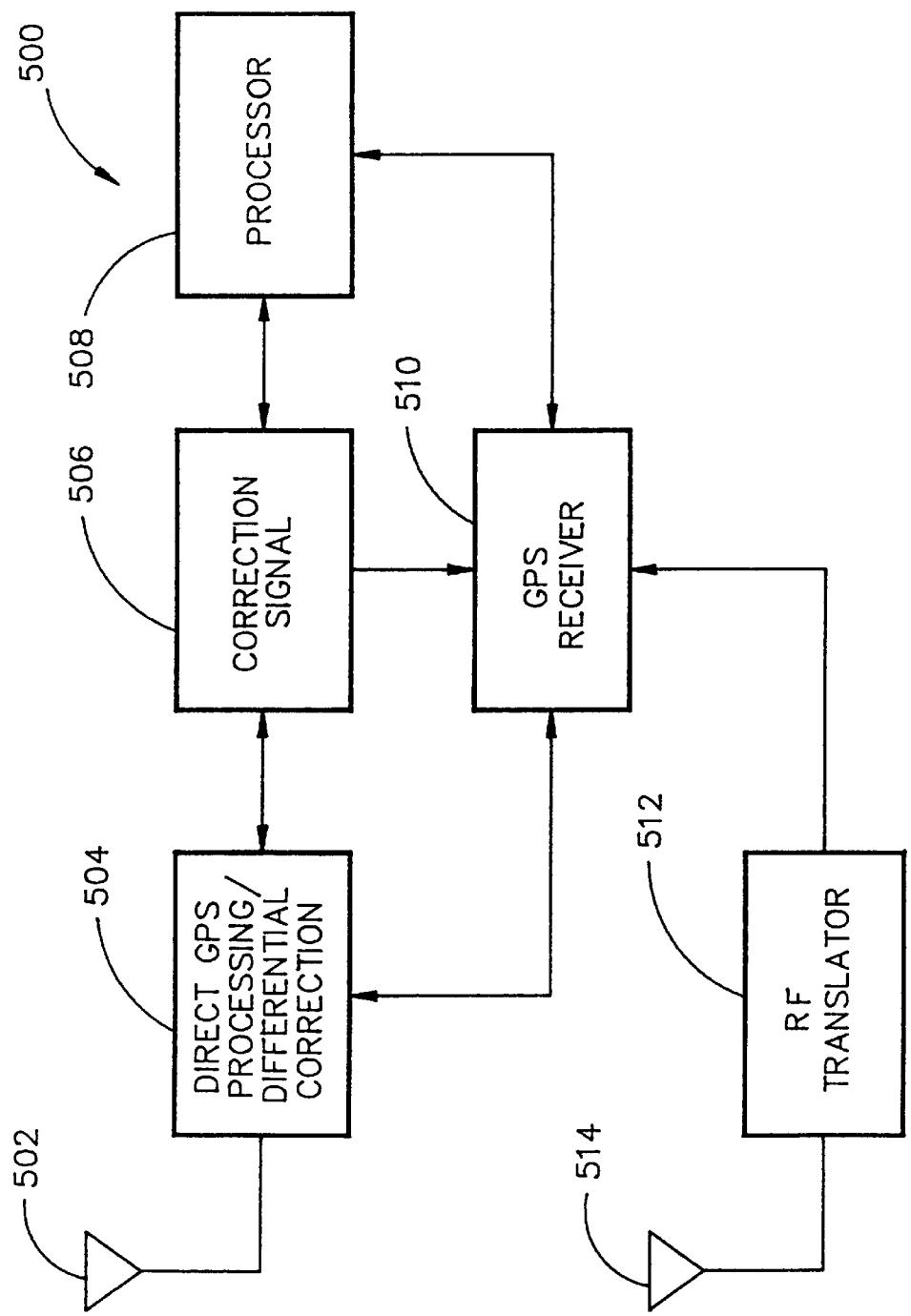
FIG. 5 is a block diagram of an embodiment of a ground station for utilization with the system of the present invention.

Referring now to FIG. 3, an illustration of an embodiment of a remote position sensing and control system in accordance with the present invention is shown. The system 300 may be generally thought of as including an unmanned flight vehicle 302 having an onboard radio receiver such as a GPS receiver as shown in FIG. 4 capable of receiving satellite band signals 320–328 emanating from a constellation of space vehicles 310–318. The radio receiver is able to compute the instantaneous position of the vehicle 302 with respect to the surface of the earth 304 by processing the signals received from space vehicles 310–318. This information is then provided to an onboard transmitter such as shown in FIG. 4 disposed within the flight vehicle 302. The transmitter formats the data along with any other flight information predetermined for down link via the transmitter to a base station 330. The base station 330 includes a transceiver such as shown in FIG. 5 capable of receiving and processing signals emanating from the flight vehicle transceiver and in a similar fashion, uplinking signals to vehicle 302 via communications link 332. The information included in the downlink to the base station is utilized at the base station to process a projected path of travel for vehicle 302.

In operation, the vehicle 302 could be a projectile such as a shell launched from an artillery gun, a ground or air based missile, or some other unmanned self-propelled or projected vehicle. In most instances it is envisioned that vehicle 302 would travel at a high rate of speed through the atmosphere of the earth preferably landing or circling a destination 306 located 30 kilometers or more from the base station 330. The receiver disposed on vehicle 302 is preferably a NavStar GPS receiver that determines positional location by virtue of receiving signals from any four or more of the space vehicles 310–318 simultaneously each having a uniquely identified telemetry down-link. Upon the calculation of the relative position of vehicle 302 such information is modulated on to a signal via the transceiver of FIG. 4 and sent to base station 330 as a GPS pseudo-lite signal. The pseudo-lite signal is capable of reception by either a specially modified GPS receiver or a receiver configured to receive and process that signal. Further details of the onboard and ground station equipment are set forth with respect to FIGS. 4, 5 and 6.

Additionally, a ground based differential station 334 may be operatively disposed relative to base station 330 for providing improved tracking and positioning determining techniques. The differential station 334 may be in communicative contact with the flight vehicle 302 and the base station 330 via communication links 336 and 338, respectively. Utilization of the differential station 334 allows for position error correcting techniques to be applied in positioning calculations such as differential GPS techniques may be desired to provide improved tracking precision or redundant tracking, for example.

FIG. 4 illustrates a transceiver 400 comprising a GPS receiver 402 and variable band data link transmitter 404 suitable for incorporation on a flight vehicle such as vehicle 302 of FIG. 3. The GPS receiver 402 is provided with an antenna 406 coupled to traditional front end receiver processing, including low noise amplifying and filtering components 408 and an RF translator 410 for converting either the L1 or L2 signal received from the down link space vehicles and translating the same to an intermediate frequency. The IF signal is then coupled to processing means 412 where additional telemetry data such as temperature or other physical measured components of the vehicle are combined with the GPS position determination and subsequently linked to transmitter 404. Transmitter 404 then broadcasts such modulated information to the base station for processing and analysis. Additional functions such as encryption or some other processing subsystem, may optionally be configured as separate components 416 and 418 respectively.

As depicted, the GPS receiver 402 is capable of processing either L1 or L2 signals. In either case, the GPS measurements and telemetry information may be spread using a GPS P-code from a spare channel in the GPS receiver or a separate code generator. The data may then be modulated onto an in-phase component I, of the pseudo-lite signal in bi-phase phase-shift keying (BPSK) format. For those instances requiring additional data could be modulated on to the quadrature phase, Q component of the pseudo signal by creating quaternary phase-shift keying (QPSK) format, thereby doubling the rate of data transmission. After modulation, the pseudo signal is translated to the desired transmission frequency, such as S-band and transmitted.

FIG. 5 illustrates in block diagram format a ground station 500 capable of utilization in the present invention. As shown, a direct GPS receiver 504 is coupled to a pseudo-lite GPS transceiver 510, and together are capable of receiving and processing the down link signal from the transmitter 404 of FIG. 4. The transceiver 510 includes an antenna 514, a translator 512, for converting the variable band signal to L1 or to IF, and subsequently creates a navigation solution which is routed to ground processing means 508, thereby providing accurate input to be utilized by an operator of vehicle 302 of FIG. 3.

In an attempt to provide increased accuracy, a differential correction signal 506 may be created in the ground base station. This information can then be factored into the positional information acquired from the remote receiver thereby providing increased accuracy of positional determination with respect to a given data point. Alternatively, a differential correction signal may be obtained from the differential station 334 of FIG. 3.

It is understood that the receiver 504 may contain multiple channels which are adapted for receiving and processing standard GPS signals in either L1 or L2 band via antenna 502. Thus, the equipment necessary for a base station operator is the equivalent of a present day portable GPS receiver. In those instances where the ground user wishes to exert control or guidance over the vehicle 302, a control signal may be generated via processor 500 and GPS transceiver 510. It should also be pointed out that when operating the above described system utilizing a GPS P-code pseudo-lite signal, the down link data can be identified for each apparatus in flight via one of thirty-seven available P-code identification screens. It is also worth noting that since the GPS signal emanates at a relative low power, at or below the noise level even at short range, the chances of undesired determination of the location of the ground station are greatly reduced by the above described scheme. Furthermore, given the advantages of current day electronic fabrication and assembly techniques, the onboard GPS receiver and transmitter transceiver can be fabricated on printed circuit boards utilizing standard assembly techniques having relatively small footprints. Associated power necessary to operate such a signal is greatly reduced from prior art p(y) analog data translators which typically operate consuming 16–24 watts of power in contrast with the described invention which can be operated at less than 1.5 watts power. In addition, the ability to uniquely identify the data stream from each flight apparatus by virtue of the P-code sequence identifier provides the inherent capability to monitor up to 37 transmitters simultaneously in flight as contrasted to the prior art analog translator which would require duplicative equipment for duplicative ground base station equipment for each flight vehicle being monitored at a given time. In addition the onboard processing of position determination available by the present invention allows for the inclusion of telemetry data heretofore unavailable unless a separate system was utilized to down link such telemetry data.

Figure 6:
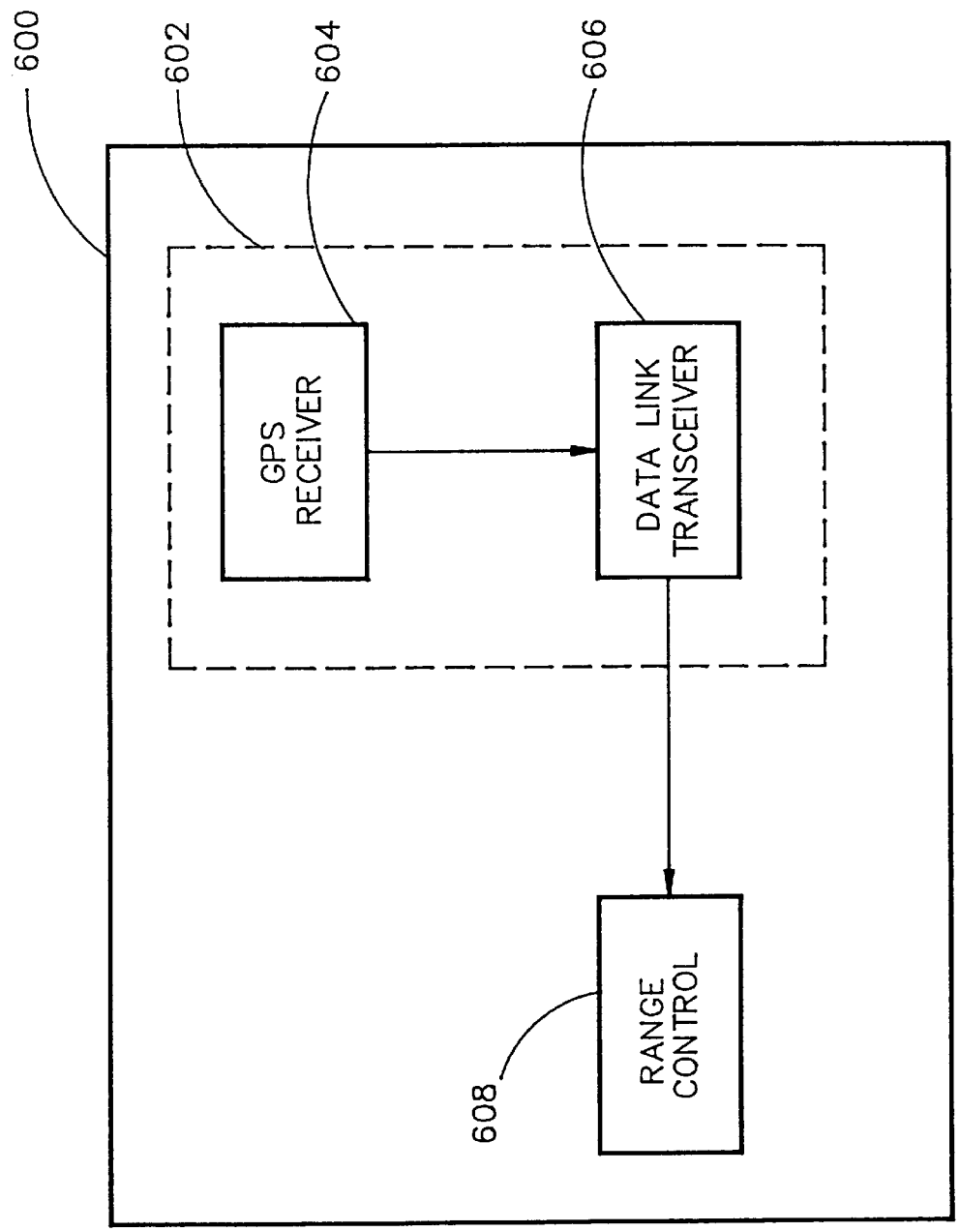
FIG. 6 is a block diagram of an embodiment of an unmanned flight vehicle system in accordance with the present invention.

Referring now to FIG. 6, a block diagram of a flight vehicle system in accordance with the present invention is shown. The unmanned flight vehicle system of FIG. 6 may be utilized with the unmanned flight vehicle of FIG. 3. The flight vehicle system 600 comprises a GPS receiver 604 and data link transceiver 606 which may correspond to receiver 402 and transmitter 404 of FIG. 4. Receiver 604 and transceiver 606 may be utilized together to provide the auto-registration components 602 for the flight vehicle. The addition of a range control system 608 coupled to the auto-range components 602 may be used cooperatively in order to provide improved targeting accuracy of the flight vehicle 302 through utilization of the remote position sensing and control system of FIG. 3 in accordance with the teachings of the present invention. The components of the flight vehicle system 600 may be disposed within the fuze of the flight vehicle 302.

The flight vehicle system 600 may provide three modes of functionality. In the first mode, only auto-registration is utilized for short to medium ranges (up to 40 kilometers) where it is most effective. Sole use of auto-registration provides approximately 2 to 3 times the error reduction over non-competent munitions. In auto-registration only mode, only the registration round requires a fuze having the flight control system 600. In the second mode, range-only correction is utilized. The range-only mode is more cost effective than auto-registration only mode for the approximate range of 40 to 60 kilometers and provides 2.5 to 6 times the error reduction over non-competent munitions. Range-only correction mode further provides the advantage of "fire and forget" capability once the proper drag deployment timing is determined. In the third mode, range correction and auto-registration are utilized for longer range or higher accuracy requirements. The third correction mode provides three to eight times the error reduction over non-competent munition, approaching the accuracy of fully guided munitions at a much lower cost, size and complexity. The third correction mode provides higher accuracy than range-only correction at the 40 to 60 kilometer range at only a slightly higher per fuze cost. Further, the third correction mode provides high accuracy at a low cost at ranges over 50 kilometers.

While particular embodiments of the present invention have been shown and described, it should be clear that changes and modifications may be made to such embodiments by one of ordinary skill in the art without departing from the spirit of the invention. It is intended that the appended claims cover all such changes and modifications.

What is claimed is:

1. A remote position sensing and control system for utilization with an unmanned flight vehicle, comprising:

a radio-frequency receiver for receiving a positioning signal, said radio frequency receiver being capable of determining the instantaneous position of the unmanned flight vehicle relative to the surface of the earth from said positioning signal;

a radio-frequency transceiver operatively coupled to said radio-frequency receiver for transmitting the instantaneous position of the unmanned flight vehicle to a remote receiver for providing auto-registration trajectory correction of a subsequent flight vehicle; and a range control apparatus operatively coupled to said radio-frequency transceiver for providing range course correction of the unmanned flight vehicle during flight.

2. A remote position sensing and control system as claimed in claim 1, wherein said radio-frequency receiver comprises a global positioning system receiver.

3. A remote position sensing and control system as claimed in claim 1, wherein said radio-frequency transceiver provides a down link signal containing the instantaneous position of the unmanned flight vehicle, said down link signal being a global positioning system pseudo-lite-signal.

4. A remote position sensing and control system as claimed in claim 1, wherein the positioning signal includes coarse acquisition code transmitted by a constellation of space vehicles, said radio-frequency receiver being capable of processing the coarse acquisition code.

5. A remote position sensing and control system as claimed in claim 1, wherein the positioning signal includes precise code transmitted by a constellation of space vehicles, said radio-frequency receiver being capable of processing the precise code.

6. A remote position sensing and control system as claimed in claim 1, wherein said transmitter has a range on the order of 100 kilometers.

7. A remote position sensing and control system as claimed in claim 1, wherein said transmitter has a range on the order of 50 kilometers.

8. A remote position sensing and control system as claimed in claim 1, wherein the flight time of the unmanned flight vehicle is up to six minutes.

9. A remote position sensing and control system as claimed in claim 1, wherein the flight time of the unmanned flight vehicle is up to three minutes.

10. A remote position sensing and control system as claimed in claim 1, wherein the remote position sensing and control system is disposed within a fuze adapted for the unmanned flight vehicle.

11. A remote position sensing and control system for utilization with an unmanned flight vehicle, comprising:

an auto-registration trajectory correction system having system components capable of providing auto-registration trajectory correction of the unmanned flight vehicle;

a range control trajectory correction system having system components capable of providing range control trajectory correction of the unmanned flight vehicle; and wherein said auto-registration trajectory and range control (correction system components are disposed within a package operatively insertible into the unmanned flight vehicle.

12. A remote position sensing and control system as claimed in claim 11 wherein the unmanned flight vehicle is an artillery shell.

13. A remote position sensing and control system as claimed in claim 12 wherein the artillery shell is a 155 millimeter shell.

14. A remote position sensing and control system as claimed in claim 12 wherein the package is a fuze for the artillery shell.

15. A remote position sensing and control system as claimed in claim 11, wherein said flight vehicle has a range on the order of 100 kilometers.

16. A remote position sensing and control system as claimed in claim 11, wherein said flight vehicle has a range on the order of 50 kilometers.

17. A remote position sensing and control system as claimed in claim 11, wherein the flight time of the unmanned flight vehicle is up to six minutes.

18. A remote position sensing and control system as claimed in claim 11, wherein the flight time of the unmanned flight vehicle is up to three minutes.

19. A remote position sensing and control system for determining and controlling the trajectory of an unmanned flight vehicle, comprising:

a first receiver disposed within the unmanned flight vehicle for receiving a positioning signal from which the instantaneous position of the unmanned flight vehicle may be determined;

a transceiver disposed within the flight vehicle for transmitting the instantaneous position of the unmanned flight vehicle as a telemetry signal;

a range correction device disposed within the unmanned flight vehicle for controlling the range of the unmanned flight vehicle during flight; and a base station having a second receiver for receiving the instantaneous position of the unmanned flight vehicle transmitted from the telemetry signal transmitted by said transceiver.

20. A remote position sensing and control system as claimed in claim 19, wherein said base station receiver may determine the instantaneous position of the unmanned flight vehicle at the termination of flight to provide auto-registration trajectory correction of a subsequent flight vehicle.

21. A remote position sensing and control system as claimed in claim 19, wherein said range correction device may alter the trajectory of the unmanned flight vehicle during flight for terminating the trajectory at a desired location.

22. A remote position sensing and control system as claimed in claim 19, wherein said base station is capable of simultaneously tracking up to thirty-seven flight vehicles.

23. A remote position sensing and control system as claimed in claim 19, wherein said base station further includes a transmitter for transmitting a control signal to the unmanned flight vehicle for activating the range control device.

24. A remote position sensing and control system as claimed in claim 19, wherein said first receiver is a global positioning system receiver.

25. A remote position sensing and control system as claimed in claim 19, wherein said second receiver is a global positioning system receiver.

26. A remote position sensing and control system as claimed in claim 19, wherein the telemetry signal is an encrypted signal.

27. A remote position sensing and control system as claimed in claim 19, wherein the telemetry signal is a global positioning system pseudo-lite-signal.

28. A remote position sensing and control system as claimed in claim 19, wherein said base station provides a correction signal for providing an improved determination of the instantaneous position of the unmanned flight vehicle.

29. A remote position sensing and control system as claimed in claim 19, further including a differential station disposed relative to said base station having a global positioning system receiver to provide an improved determination of the instantaneous position of the unmanned flight vehicle.

30. A remote position sensing and control system as claimed in claim 19, wherein said data is encoded in the in-phase and quadrature phase intermediate frequency components of the telemetry signal transmitted by said transceiver.

31. A remote position sensing and control system as claimed in claim 19, wherein the range between said transceiver and said second receiver is up to 100 kilometers.

32. A remote position sensing and control system as claimed in claim 19, wherein the range between said transceiver and said second receiver is up to 50 kilometers.

* * * * *